(12) United States Patent
Verna

(10) Patent No.: US 7,059,617 B1
(45) Date of Patent: Jun. 13, 2006

(54) DOLLY

(75) Inventor: Donald Verna, Wixom, MI (US)

(73) Assignee: Pinckney Molded Plastics, Inc., Howell, MI (US)

( * ) Notice: Subject to any disclaimer, the term of this patent is extended or adjusted under 35 U.S.C. 154(b) by 13 days.

(21) Appl. No.: 10/082,680

(22) Filed: Feb. 25, 2002

(51) Int. Cl.
*B62B 3/00* (2006.01)

(52) U.S. Cl. .................................... 280/79.3

(58) Field of Classification Search ............ 280/79.11, 280/79.2, 79.3, 47.34, 47.35, 651; 16/29, 16/30, 31 R, 42 T
See application file for complete search history.

(56) References Cited

U.S. PATENT DOCUMENTS

| | | | |
|---|---|---|---|
| 211,828 A | 2/1879 | Ash | |
| 1,778,654 A | 10/1930 | Wright | |
| 2,990,191 A | 6/1961 | Black | 280/79.1 |
| 4,077,644 A * | 3/1978 | Roby et al. | 280/47.34 |
| 5,257,794 A * | 11/1993 | Nakamura | 280/79.3 |
| 5,299,817 A | 4/1994 | Chang | 280/35 |
| 5,484,150 A * | 1/1996 | Yasutomi | 280/79.3 |
| 5,503,417 A | 4/1996 | Murphy | 280/79.11 |
| 5,695,205 A * | 12/1997 | Liu | 280/79.2 |
| 6,036,219 A * | 3/2000 | Oefelein et al. | 280/651 |
| 6,095,533 A * | 8/2000 | Balolia | 280/79.11 |

FOREIGN PATENT DOCUMENTS

| | | | | |
|---|---|---|---|---|
| DE | 3815990 | * | 2/1989 | 280/79.11 |
| JP | 40-4-81359 | * | 3/1992 | 280/79.11 |
| JP | 40-6-206545 | * | 7/1994 | 280/79.11 |

OTHER PUBLICATIONS

Partial Machine translation (Altavista Babelfish Service) of col. 2, lines 31-36 of reference DE 3815990A to Lutz, cited previously.*
English Translation of German Patent, Author—Lutz, Title—Transporter Trolley Frame With Castors; Data—Feb., 1989; Publisher—DE; 4 pages including Certification Patent No. DE 38 15990 A1.

* cited by examiner

*Primary Examiner*—Frank Vanaman
(74) *Attorney, Agent, or Firm*—Young & Basile, P.C.

(57) ABSTRACT

A dolly for transport of a rectangular member, such as a basket. The dolly is formed from corner members made of plastic material and having essentially hollow interiors to maintain a lightweight assembly. The corner members are interconnected by standard tubular members. The corner members are made of an upper and lower half element each having a channel therein so that when connected form a pathway for receiving the tubular members. The upper half element has an exposed surface for receiving a corner portion of the rectangular member to minimize shifting and other movement of the rectangular member.

18 Claims, 3 Drawing Sheets

DOLLY

BACKGROUND OF THE INVENTION

This invention relates to a dolly structure for transporting goods.

Certain industries, such as the bakery industry, find it necessary to move large numbers of goods from one point to another, whether within the same factory or during delivery of the goods. Small goods are generally stored within stackable baskets. The baskets are then transported on a dolly. Previously, dollies have been heavy and awkward to maneuver, the components have been relatively expensive, and the assembly of the dollies has been time consuming.

SUMMARY OF THE INVENTION

It is the intent of the invention to address the aforementioned concerns.

In one aspect of the invention, the dolly has four corner members which are connected by tubular members to form a frame for receiving a rectangular basket. The corner member of the dolly includes an upper and lower element made of a durable plastic material connectable to form the corner member. A caster wheel is rotatably connectable to each lower element of the corner member.

In another aspect of the invention, the upper element of the corner member has an exposed surface receiving a portion of a rectangular member. The exposed surface also has raised walls for defining corner edges of the dolly.

In another aspect of the invention, the exposed surface of the upper element of the corner member is grooved to correspond with a corner bottom portion of the basket.

In yet another aspect of the invention, when the upper and lower elements are connected to form the corner member, the corner member forms an essentially hollow cavity therein, having side access apertures each for receiving an end of a tubular member into the cavity. The side access apertures open to a through channel in the cavity.

In yet another aspect of the invention, the channel has stop means therein for limiting the travel of the end of the tubular member so that exposed lengths of the tubular members are essentially equal on opposing sides.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
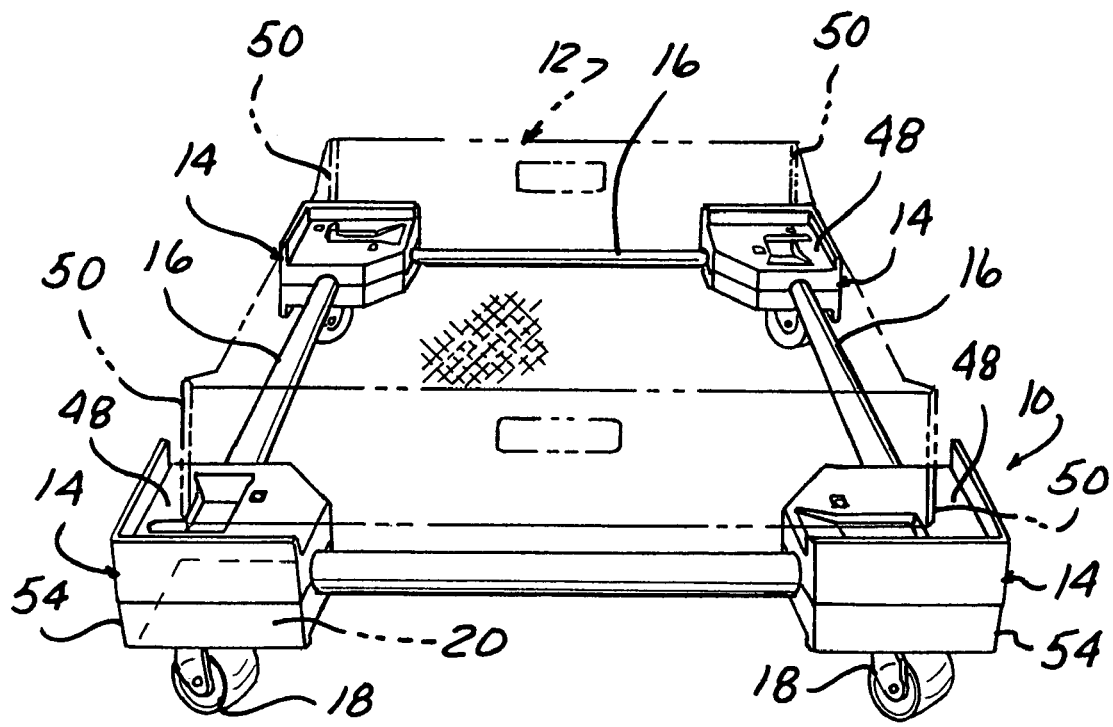
FIG. 1 is a perspective view of a dolly according to the present invention showing a basket in phantom resting thereon.
Figure 6:
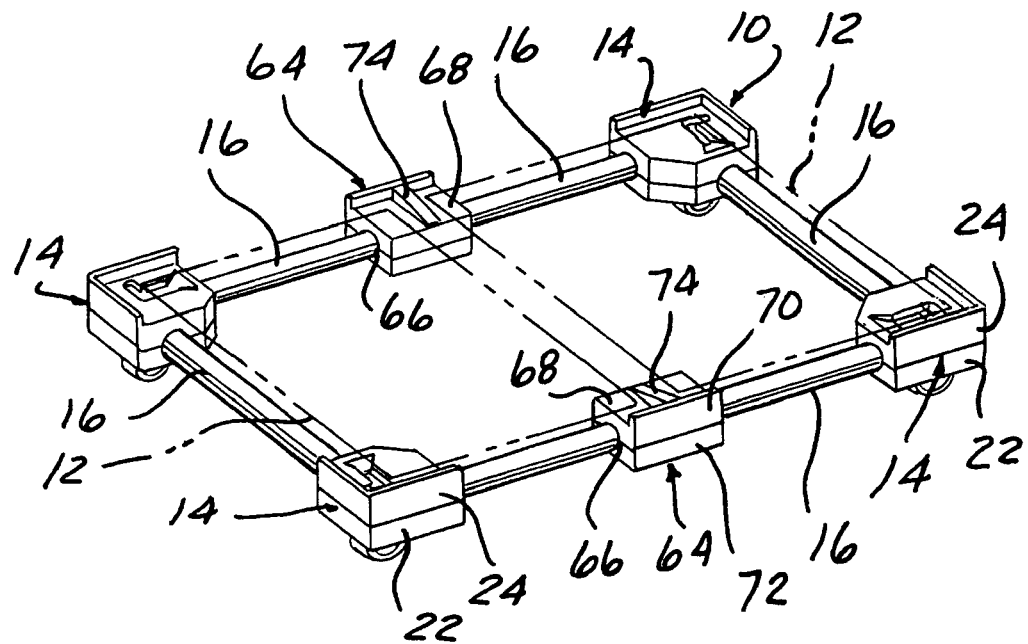
FIG. 6 is a perspective view of an alternative embodiment of the dolly with a pair of baskets shown in phantom placed thereon.
Figure 2:
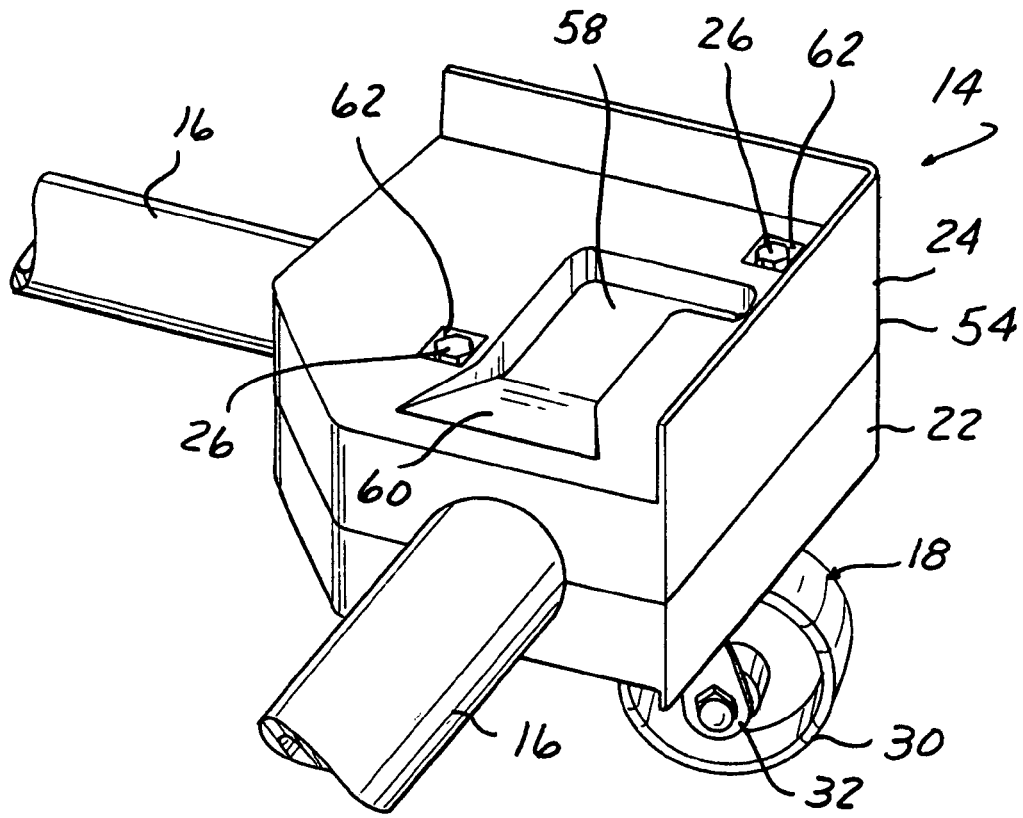
FIG. 2 is a perspective view of a corner member of the dolly showing portions of tubular members connected thereto.
Figure 3:
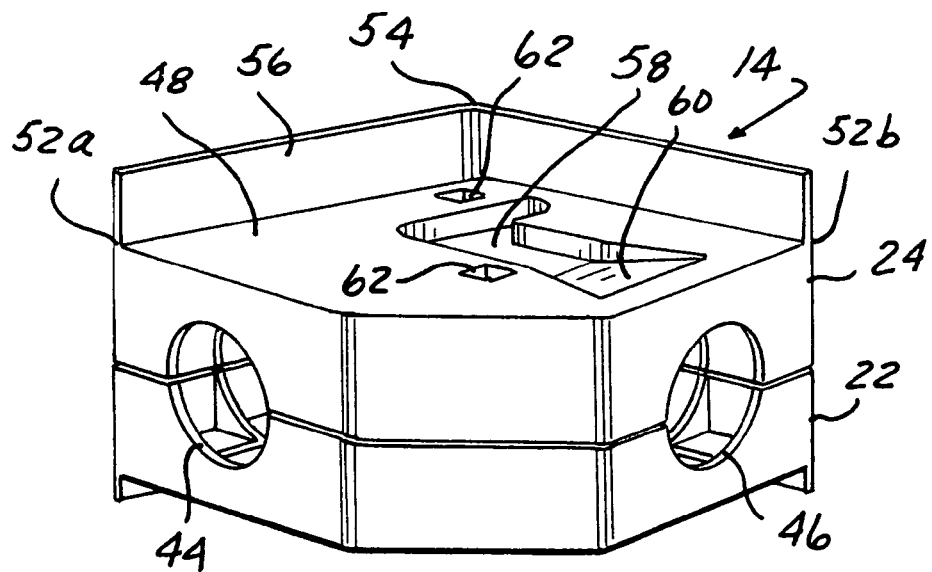
FIG. 3 is another perspective view of the corner member without the tubular members.

Referring to FIGS. 1 and 6, a dolly 10 is illustrated for transporting one or more baskets 12. Looking especially at FIG. 1, the dolly 10 includes four corner members 14 interconnected by four tubular members 16. Each corner member 14 has a caster wheel 18 attached to a bottom surface 20 of the corner member 14. To minimize the cost and facilitate the assembly of the dolly, the corner members 14 are made of a durable plastic material. The plastic material also provides a lighter weight dolly. Standard galvanized fencing or other metallic conduit is used for the tubular members 16. The tubular members 16 may be cylindrical, as shown in the Figures. However, the tubular members 16 may also have rectangular or other shapes, such as in an I-beam. The caster wheel 18 on each corner member 14 is a standard and known type.

Referring now to FIGS. 2–5, the corner member 14 is formed by connecting a lower half element 22 to an upper half element 24. The lower and upper half elements 22 and 24, respectively, are securely connected to each other by means of bolts 26. The bolts 26 are threadably insertible into apertures formed by integral dowels 28a, b, and 29a, b that extend into the interior surface 42a, 42b of the lower and upper half elements 22 and 24, respectively.

The conventional caster 18 includes a wheel 30 rotatably connected to a yoke 32. The yoke 32 has a center stud (not shown) that fits within an aperture formed by the dowels 34a, 34b in the lower and upper half elements 22, 24, respectively. The aperture in dowel 34a extends through the bottom surface 20 of the lower half element 22, but does not extend through the upper surface of the upper half element 24.

Figure 4:
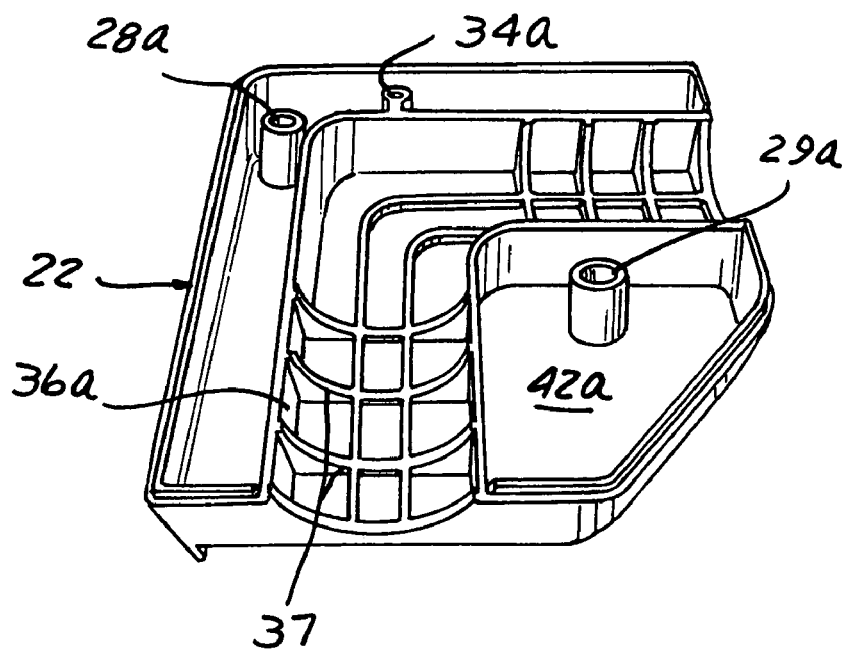
FIG. 4 is a perspective view of a lower half element of the corner member.
Figure 5:
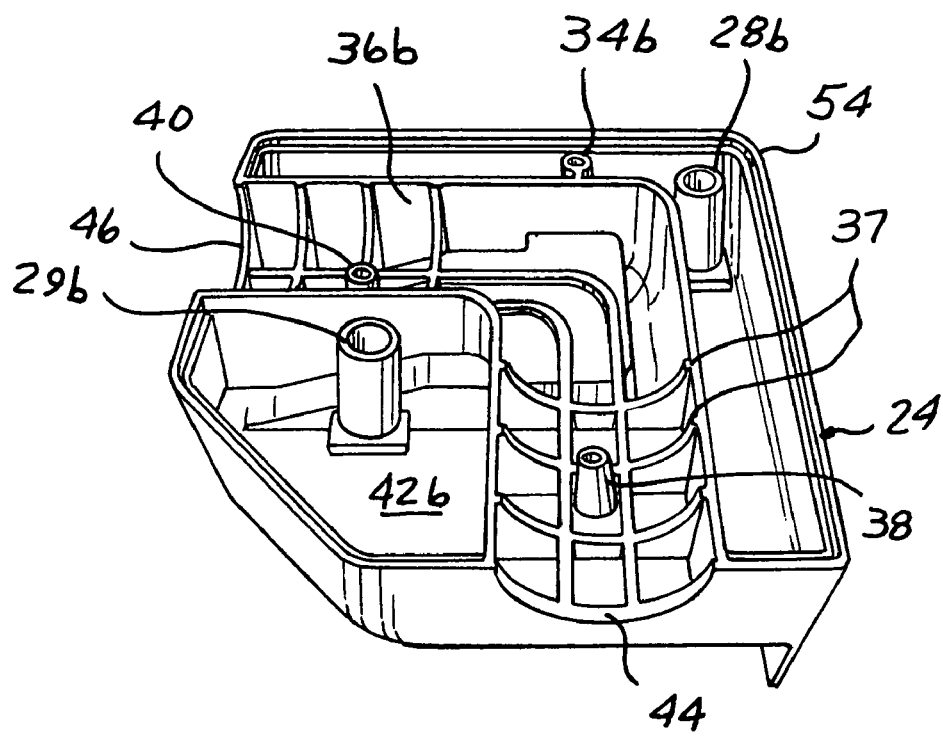
FIG. 5 is a perspective view of an upper half element of the corner member.

As can be seen in FIGS. 4 and 5, the corner member 14 is essentially hollow therein except for the dowels and a channel 36a, 36b formed in each lower and upper half element 22 and 24, respectively. The channels 36a and 36b are formed in each of the lower and upper half elements 22, 24, respectively, to house the ends of the tubular members 16 therein when the upper 24 and lower 22 half elements are connected as the corner member 14. Each channel 36a, 36b is configured and positioned to overlay each other when the lower and upper half elements, 22, 24 are connected. The channels 36a, 36b form a continuous path for receiving a portion of the tubular members. The channels 36a, 36b are preferably ribbed 37 to provide added strength and durability at that portion of the corner member 14 for holding the weight of the metallic tubular member 16 therein. The channels 36a, 36b preferably have a configuration corresponding to the shape of the tubular members 16.

As can be seen in FIG. 5, the channel 36b in the upper half element 24 has inwardly extending dowels 38, 40 extending from the interior surface 42b and positioned at predetermined locations from the open ends 44, 46 of the channel 36b. The dowels 38, 40 in channel 36b form a stop for the ends of the tubular members 16 and thereby limit the travel of the end of the tubular member 16 when inserted into the corner member 14. The dowels 38, 40 may have other formations that stop the axial movement of the tubular members 16 into the corner member 14.

The upper half element 24 has an exposed upper surface 48 configured to accommodate the corner edges 50 of the basket 12. The two exterior surfaces 52a, b of the upper half elements 24 that intersect to form the corner edges 54 of the corner member 14 have a raised lip 56 along the periphery of the two edges. The raised lip 56 confines the basket 12 within the boundaries of the corner members 14. The upper surface 48 of the upper half element 24 preferably has a groove or notch 58 configuration for accommodating the legs of the basket 12 to prevent the basket 12 from sliding along the upper surface 48 of the upper half element 24. As better seen in FIG. 3, the configuration may also include a ramp 60 for easily sliding baskets 12 into place on the dolly 10. In addition, the upper exposed surface 48 of the upper half element 24 may include recessed areas 62 surrounding the aperture for the bolts 26. The recessed area 62 inhibits the bolt 26 from interfering with the bottom surface of a basket 12 and essentially provides that the bolts 26, when installed into the corner member 14, lay flush with the upper exposed surface 48.

FIG. 6 shows another embodiment in which two center members 64 are disposed between two other corner members 14 such that the two center members 64 are parallel to each other. The two center members 64 include the same characteristics as the corner members 14 except that they optionally may not include means for connecting a caster wheel 18 thereto. Each center member 64 is an assembly of an upper 70 and lower 72 element connected together, preferably by bolts. Although not shown in the drawings, the center members 64 will form a cavity therein to maintain the light weight attribute of the dolly 10. Each opposing side of the center member 64 will have an aperture 66 for receiving an end of the tubular member 16 and a through channel (not shown) therein. The upper surface 68 of the center member 64 will preferably have a particular configuration for receiving the contours of the end of a basket. The intent of the center members 64 is to provide accommodations for two baskets to lay flat, side by side, on the dolly 12. Therefore, the upper surface 68 of each center member 64 will preferably have a wall or a lip 74 traversing the width of the center member 64 to prevent contact between the adjacent two baskets 12 during transport. The center wall 74 further prevents the shifting of the baskets 12 and the misalignment of the baskets 12 such that they do not fall off the dolly 10.

The dolly 10 is constructed by connecting the lower and upper half elements 22 and 24, respectively, to form the corner member 14. The bolts 26 are threadably inserted into the apertures formed by dowels 28a, b, and 29a, b. The dowels 28a, b and 29a, b provide added structure to the aperture as well as providing the threaded surface for the bolts 26. Conventional caster wheels 18 are inserted into the apertures formed by dowels 34a, 34b so that the dolly 10 can move along a level surface.

Once the corner members 14 are assembled, tubular members 16 are installed into the apertures formed by the channels 36a, 36b. The stop means 38 and 40 limit the travel of the tubular members 16 into the channel aperture. Therefore, the opposing sides of the dolly 10 should have tubular members 16 of the same length to form a dolly with a rectangular configuration.

The advantage of the present invention is to provide a lightweight, easily assembled, inexpensive dolly for transporting rectangular members, such as baskets, from one location to another. Because the tubular members are simply inserted within the cavity of the corner members, the length and size of the dolly can be easily changed by merely replacing tubular members of one size with tubular members of a different size.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A dolly having assembled members interconnected by tubular members to form a frame for receiving a rectangular member therein, the assembled member comprising:

an upper and a lower element connectable to form the assembled member, the upper and lower elements forming an essentially hollow cavity therein, said assembled member having a plurality of side access apertures for receiving an end of the tubular members into said cavity, said side access apertures open to a common through channel in said cavity for receiving portions of the tubular members therein, at least one of the upper and lower elements having a first integrally formed projection extending into the channel at a predetermined location for defining a first stop means for limiting travel of the end of a first tubular member into the channel.

2. The dolly of claim 1, wherein the upper element has an exposed surface for receiving a portion of the rectangular member and an interior surface, said exposed surface having at least one raised wall for defining edges of the dolly.

3. The dolly of claim 2, wherein the exposed surface of the upper element is grooved to correspond with a corner bottom portion of the rectangular member.

4. The dolly of claim 2, wherein the exposed surface of the upper element has a raised lip traversing the width of a center portion of the upper element for receiving portions of two rectangular members thereon.

5. The dolly of claim 1, further comprising a caster wheel rotatably connectable to each lower element, the lower element has an exposed lower surface having at least one aperture therein for receiving a connecting means of the caster wheel and an interior surface.

6. The dolly of claim 5, wherein the caster wheel has a hub rotatably connected to a yoke, said yoke having a center post for disposition in the at least one aperture in the lower element.

7. The dolly of claim 6, wherein the at least one aperture in the lower element extends into an integral dowel formed on the interior surface of said lower element.

8. The dolly of claim 7, wherein the upper element has an exposed surface for receiving a portion of the rectangular member, said exposed surface of the upper element has raised walls for defining corner edges of the dolly, said exposed surface of the upper element has apertures therein for receiving bolts to connect the upper and lower elements, said apertures in the upper element extend into integral dowels formed on the interior surface of the upper element.

9. The dolly of claim 8, wherein the apertures for receiving bolts are located in recessed portions in the exposed surface of the upper element for positioning exposed portions of the bolt below other portions of the exposed surface of the upper element.

10. The dolly of claim 7, wherein the hollow interior has reinforcement dowels for receiving bolts to secure the member together and the upper element has an exposed surface for receiving a portion of the rectangular member and the exposed surface has a groove therein to correspond with a corner bottom portion of the rectangular member and a ramp leading to the groove for easily sliding the rectangular member onto the dolly, wherein the exposed surface of the upper element has a recessed portion around the apertures for receiving the bolts to connect the upper and lower elements.

11. The dolly of claim 10, wherein the exposed surface of the upper element has a ramp leading to the groove and the groove has an L-shaped configuration.

12. The dolly of claim 1, wherein the hollow cavity has reinforcement dowels for receiving bolts to secure the assembled member together.

13. The dolly of claim 12, wherein the upper element has an exposed surface for receiving a portion of the rectangular member and the exposed surface has a groove therein to correspond with a corner bottom portion of the rectangular member and a ramp leading to the groove for easily sliding the rectangular member onto the dolly.

14. The dolly of claim 13, wherein the apertures for receiving the bolts to connect the upper and lower elements are positioned in recessed portions of the exposed surface of the upper element.

15. The dolly of claim 1, wherein the channel further comprises a second projection extending into the channel at a predetermined location for defining a second stop means for limiting the travel of an end of a second tubular member into the channel.

16. The dolly of claim 1, wherein the side access apertures comprise a first side access aperture for receiving an end of the first tubular member and a second side access aperture for receiving an end of a second tubular member, the first and second side access apertures open to the common through channel.

17. The dolly of claim 16 further comprising a second projection extending into the channel at a predetermined location for defining a second stop means, wherein the first stop means limits travel of the end of the first tubular member into the channel and the second stop means limits travel of the end of the second tubular member into the channel.

18. A dolly having assembled members interconnected by tubular members to form a frame for receiving a rectangular member therein, each assembled member comprising:

an upper and lower element connectable to form the assembled member, the upper and lower members forming an essentially hollow cavity therein, said assembled member having side access apertures for receiving an end of the tubular member into said cavity, said side access apertures open to a through channel in said cavity for receiving portions of the tubular members therein and wherein the channel has stop means for limiting the travel of the end of the tubular member, said stop means includes a projection extending into the channel from an interior surface of the lower element and an exposed surface of the upper element has apertures therein for receiving bolts to connect the upper and lower elements, said apertures in the upper element extend into integral dowels formed on an interior surface of the upper element, wherein the dowels extend into the hollow cavity outside of the periphery of the channel.

* * * * *